United States Patent Office 3,642,761
Patented Feb. 15, 1972

3,642,761
DEGRADATIVE POLYOLEFIN COMPOSITION
Fukuichi Ohira, Ichiharashi, Toshikazu Matsumura, Yokohamashi, and Chuji Shiode, Ichiharashi, Japan, assignors to Chisso Corporation, Osaka, Japan
No Drawing. Continuation-in-part of application Ser. No. 778,762, Nov. 25, 1968. This application Nov. 2, 1970, Ser. No. 86,279
Claims priority, application Japan, Dec. 6, 1967, 42/78,325
Int. Cl. C08f 3/02
U.S. Cl. 260—93.7
3 Claims

ABSTRACT OF THE DISCLOSURE

Polypropylene composition with added aldol-alpha-naphthylamine so as to facilitate degradation.

CROSS-REFERENCES TO RELATED APPLICATION

This application is a continuation-in-part of United States Ser. No. 778,762, now abandoned.

BACKGROUND OF THE INVENTION

Field of the invention

This invention relates to a polyolefin composition having a degradative nature whose decomposition is accelerated under natural environment condition.

Polypropylene or a composition obtained by admixing another thermoplastic resin, rubber, an inorganic filler or the like with polypropylene as the principal component have been consumed in large amounts for the production of various kinds of, shaped articles such as vessels, general merchandise, films for packaging use, rope, thread and fibers.

The polypropylene used for these purposes must have stability. On this account, there has been an attempt to increase durability by adding various kinds of stabilizers.

However in some application fields e.g. in the application field of binding tapes used in agriculture and mowing machines for rice plants, it has been found necessary that these tapes be degradated and decomposed after being used in order that the natural environment is not spoiled and so that the operational efficiency is thereby improved.

Accordingly, it is an object of the present invention to provide a polypropylene composition which is sufficiently stable until it is used but which after use has such inferior weathering properties that it is readily decomposed under natural environmental conditions mainly by the action of light.

SUMMARY OF THE INVENTION

The present invention involves incorporating aldol-alpha-naphthylamine in polypropylene or in a composition containing polypropylene as the principal component together with another thermoplastic resin rubber, inorganic filler or the like. In other words it has been found by the present inventors that degradation of polypropylene compositions particularly by the action of actinic light, is remarkably accelerated because of such incorporation.

Aldol-alpha-naphthylamine is a compound represented by the formula

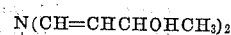

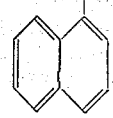

(M.P. 60° C., available from the market as a resinous product with a trade name Noclack A., Supplier: Ouchi Shinko Kagaku Kogy K.K. and Kawaguchi Kagaku Kogyo K.K.)

or by the formula

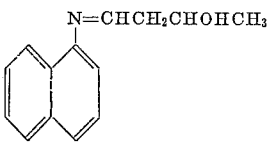

(M.P. 140° C., available from the market as a powdered product with a trade name Noclack C., Supplier: Ouchi Shinko Kagaku Kogyo K.K. and Kawaguchi Kogyo K.K.

These compounds have been known as remarkably useful antioxidants in rubbers. It is therefore, a quite surprising fact that these materials give degradative action to polypropylene and compositions obtained by admixing another thermoplastic resin, rubber, inorganic filler, etc. with a principal component of polypropylene.

There is no limitation as to the amount of aldol-alpha-naphthylamine which can be added to polypropylene. The amount is usually controlled adequately according to the purpose but the addition of at least 0.01% is necessary. It is desirable from an economical viewpoint that the maximum amount of addition is less than 3.0%, and preferably 1.0% or less.

As for the resin used, polypropylene is its principal component but it is possible to mix 35% or less by weight of another resin based upon the total weight of the composition or 40% or less by weight of an inorganic material based upon the total weight of the composition with the principal component polypropylene.

Illustrative other thermoplastic resins and rubbers which can be mixed with the polypropylene, include low density and high density polyethylenes, polybutene-1, poly-4-methylpentene-1, ethylene-vinyl acetate copolymer, butyl rubber, polyisobutylene, and butadiene rubber.

Illustrative inorganic fillers include talc, asbestos, calcium carbonate, etc. These fillers are used, of course, in the form of fine powder.

The polypropylene used herein implies the homopolymer of propylene containing at least 70% crystalline part and the block copolymer of propylene and ethylene containing a propylene segment or propylene segments and an ethylene segment or ethylene segments or an ethylene-propylene random copolymer segment or ethylene-propylene random copolymer segments the ethylene content of which block copolymer is less than 35%.

As for the method of mixing the components, any of the conventional methods can be used. For example powdered polypropylene and other powdered components are blended in a blender, or pelletized other thermoplastic resin and polypropylene are mixed by melting in an extruder to produce pellets or polypropylene and one of various kinds of rubbers can be mixed by milling in a mixing roll so as to produce a sheet form which can be followed by cutting into pellets.

The following examples are given to illustrate the compositions of the present invention but it is to be understood that they are not for the purpose of limitation. All percents herein are by weight.

Example 1.—Compositions prepared by adding each 0%, 0.05%, 0.1% and 0.2% of commercial aldol-alpha-naphthylamine (Noclack C supplied from Ouchi Shinko Kagaku Kogyo K.K.) to commercial polypropylene (brand No. 1066 supplied from Chisso Corporation) were extruded and stretched into binding tapes having a width of 42 mm. and a thickness of 33μ (approximately 11,600 denier). These tapes were subjected to a weathering test with a weatherometeer WE–SH–2C type made by Toyo Rika Kogyo (two carbon arc type, panel temperature; 75° C., room temperature; 50° C., relative humidity; 56%, kept rainy condition for 18 minutes per 120 minutes)

The results are summarized in Table 1.

TABLE 1

| Amount of Noclack C added, percent | Initial strength, kg. | Initial elongation, percent | Irradiation for 140 hours | | Durability | |
|---|---|---|---|---|---|---|
| | | | Strength, kg. | Elongation, percent | Strength, kg. | Elongation, percent |
| 0 | 50 | 33 | 50 | 33 | 100 | 100 |
| 0.05 | 45 | 28 | 30 | 15 | 67 | 57 |
| 0.1 | 45 | 25 | 16 | 10 | 36 | 40 |
| 0.2 | 50 | 28 | 8 | 5 | 18 | 17 |

After 160 hrs. exposure the composition in which 0.2% of Noclack C was incorporated became brittle and crumbled and was in a state in which testing of strength and elongation was no longer possible.

Example 2.—The compositions prepared by adding each 0%, 0.05%, 0.1% and 0.2% of a commercial aldol-alpha-naphthylamine (Noclack C) to a mixture of 90% commercial polypropylene (brand No. 1066 supplied from Chisso Corporation) and 10% of commercial low density polyethylene (brand No. F 222 supplied from Ubekosan K. K.) were extruded and stretched into binding tapes 42 mm. wide and 32μ thick. After the outdoor exposure for about 18 days starting from Aug. 1, 1967 in the city of Ichihara, Chibaken, Japan, the reductions of the strength and elongation were as listed in Table 2.

TABLE 2

| Amount of Noclack added, percent | Initial strength, kg. | Initial elongation, percent | After 10 days | | After 18 days | |
|---|---|---|---|---|---|---|
| | | | Strength, kg. | Elongation, percent | Strength, kg. | Elongation, percent |
| 0 | 45 | 15 | 48 | 17 | 52 | 18 |
| 0.05 | 44 | 17 | 38 | 12 | 23 | 7 |
| 0.1 | 41 | 14 | 30 | 10 | 17 | 5 |
| 0.2 | 44 | 14 | 28 | 9 | 17 | 5 |

From about the 24th day, the compositions containing 0.2% of Noclack fell into tatters.

Example 3.—Commercial polypropylene (brand No. 1014 supplied from Chisso Corporation) was milled on rolls at 180° C., and 0%, 0.2%, 0.4%, 1.0%, 2.0% and 3.0% of commercial adol-alpha-naphthylamine (Noclack A or C supplied from Ouchi Shinko Kagaku Kogyo K. K.) was added thereto, subjected to milling for 7 minutes and shaped into sheets 1 mm. thick by pressing with a heating press at 200° C. under 200 kg./cm.² for 5 minutes.

The resultant sheets were subjected to irradiation by the use of the same weatherometer as that of Example 1 and the irradiation time which elapsed till bending at 135° to give breakage was tested.

The result is shown in Table 3.

TABLE 3

| Amount of Noclack A added, percent | Time elapsed until breakage occurs, hr. | Amount of Noclack C added, percent | Time elapsed until breakage occurs, hr. |
|---|---|---|---|
| 0 | 600 | 0 | 600 |
| 0.2 | 40 | 0.2 | 40 |
| 0.4 | 40 | 0.4 | 40 |
| 1.0 | 40 | 1.0 | 40 |
| 2.0 | 20 | 2.0 | 20 |
| 3.0 | 20 | 3.0 | 20 |

Examples 4–12.—To commercial polypropylene (brand No. 1016 supplied from Chisso Corporation), 0.3% of commercial aldol-alpha-naphthylamine (Noclack C, supplied from Ouchi Shinko Kagaku Kogyo K. K.) and a resin or an inorganic filler described in Table 4 were added to prepare a cord having a width of 40 mm. and a thickness of 30μ. This cord was subjected to an ultraviolet ray-irradiation for 140 hours by means of a weather-O-meter, WE–SH–2C Type made by Toyo Rika Kogyo Co. Ltd. (carbon arc two lamps type; black panel temperature, 75° C.; room temperature, 50° C.; relative humidity, 56%; and 18 minutes during 120 minutes, rainy) to measure the strength. The figures shown in Table 4 are the strength retension degree of the samples of the examples expressed by percentage wherein those in the case of non-irradiation are made 100.

TABLE 4

| Example | Additive | Amount added, percent | Strength retention degree, percent |
|---|---|---|---|
| 4 | LDPE | 35 | 25 |
| 5 | HDPE | 10 | 20 |
| 6 | Butyl rubber | 20 | 18 |
| 7 | Polyisobutylene | 20 | 22 |
| 8 | Butadiene rubber | 20 | 8 |
| 9 | Asbestos powders | 20 | 7 |
| 10 | Talc powders | 10 | 22 |
| 11 | Calcium carbonate powders | 40 | 14 |
| 12 | Silica powders | 10 | 21 |

NOTE.—LDPE: Low density polyethylene (MI: 12.0); HDPE: High density polyethylene (MI: 8.0); Butyl rubber: Polysar Butyl 101 supplied from Polymer Corp.; Polyisobutylene: Vistanex L-80 supplied from Enjay Chem. Co.; Butadiene rubber: Diene 35A supplied from Asahi Kasei Kogyo Co. Ltd.

Example 13.—0.3% of aldol-α-naphthylamine as in Examples 4–12 was added to an ethylene-propylene copolymer containing 32% of ethylene unit, and a similar test to those of Examples 4–12 was carried out. As a result, the strength retention degree was 23% in contrast to a control containing no aldol-α-naphthylamine.

Example 14.—0.3% of aldol-α-naphthylamine as in Examples 4–12 was added to a block copolymer of propylene and ethylene containing a propylene segment and an ethylene-propylene random copolymer segment the ethylene content of which block copolymer is 5%, and a similar test to those of Examples 4–12 was carried out. As a result, the strength retention degree was 17% in contrast to a control containing no aldol-α-naphthylamine.

Example 15.—0.3% of aldol-α-naphthylamine as in Examples 4–12 was added to a block copolymer of propylene and ethylene containing a propylene segment and an ethylene segment the ethylene content of which block copolymer is 15%, and a similar test to those of Examples 4–12 was carried out. As a result, the strength retention degree was 20% in contrast to a control containing no aldol-α-naphthylamine.

As evident from the foregoing examples it can be seen that polypropylene and compositions obtained by admixing another thermoplastic resin, rubber, an inorganic filler or the like with polypropylene as main component, lose their strength, elongation and toughness under natural environment condition, particularly under the action of actinic ray by the addition of aldol-alpha-naphthylamine and hence are desirous when they are to be used as binding tapes for agricultural use, particularly for mower of rice plants.

What is claimed is:

1. A composition comprising a propylene containing polymer or copolymer and about 0.01–1.0% by weight of an aldol-α-naphthylamine, whereby said aldol-α-naphthylamine renders said propylene containing polymer or copolymer more readily degradable under natural environmental conditions.

2. A composition according to claim 1 wherein said aldol-α-naphthylamine has the formula:

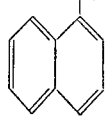

3. A composition according to claim 1 wherein said aldol-α-naphthylamine has the formula:

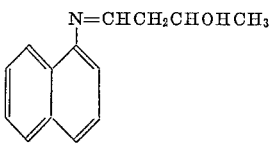

References Cited

U.S. patent application Ser. No. 778,762; Fukuichi et al., filing date Nov. 25, 1968.

JOSEPH L. SCHOFER, Primary Examiner

W. F. HAMROCK, Assistant Examiner

U.S. Cl. X.R.

260—41, 88.2 S, 94.9 GB, 897, 879